Aug. 16, 1932.  L. C. KING  1,872,562
SPECTACLES
Filed April 22, 1929
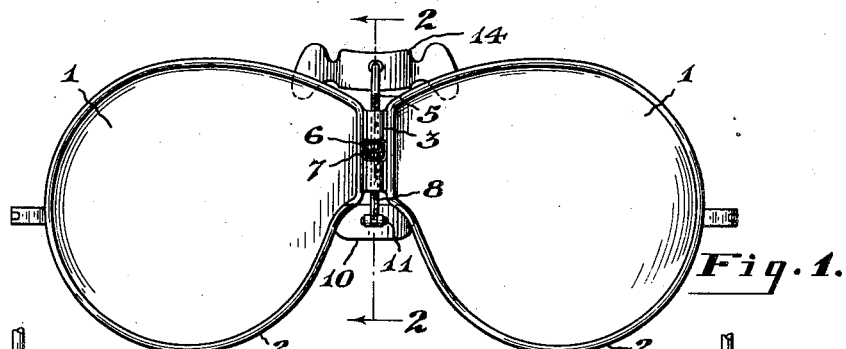
Fig. 1.
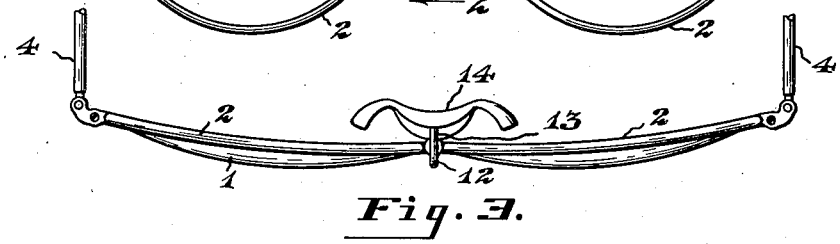
Fig. 3.
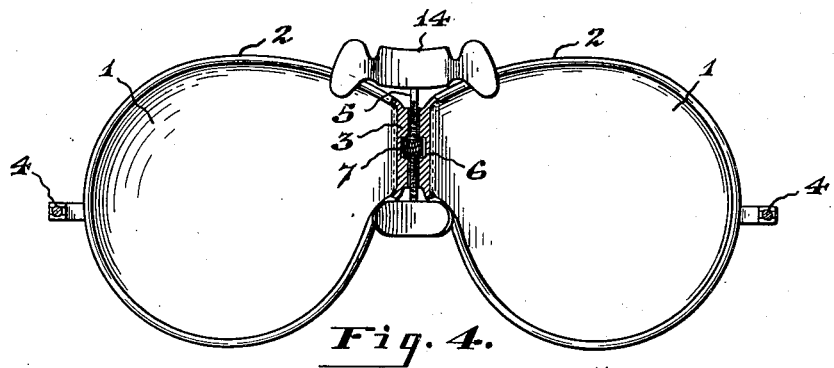
Fig. 4.
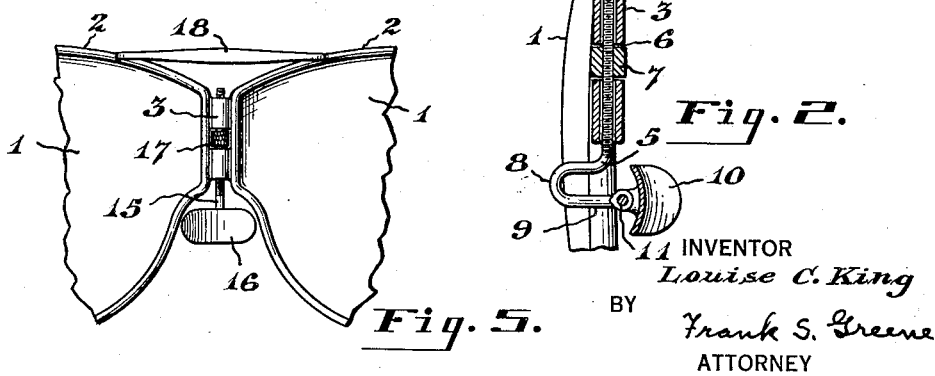
Fig. 6.
Fig. 2.
Fig. 5.
INVENTOR
Louise C. King
BY
Frank S. Greene
ATTORNEY Patented Aug. 16, 1932

1,872,562

UNITED STATES PATENT OFFICE

LOUISE C. KING, OF CLEVELAND, OHIO

SPECTACLES

Application filed April 22, 1929. Serial No. 356,904.

The present invention relates to spectacles, and while of quite general application, is particularly suitable for spectacles of the type used for shooting, motoring, golfing and various outdoor occupations in which the lenses are relatively large and are formed of a colored glass to reduce the glare of the sun.

The present invention has among its most important objects to provide spectacles which are solid and comfortably supported on the face of the wearer and which are supported with the lenses spaced outwardly from the face so that perspiration will not flow from the forehead onto the lenses and so that air may circulate freely between the face and lenses to prevent forging of the lenses by water vapor from perspiration on the face.

When used for shooting, it is desirable that the lenses be supported in a relatively high position with respect to the eyes so that the tops of the rims will be entirely out of the range of vision. At other times such as when the spectacles are used while motoring or golfing, the lenses should be in a lower position with respect to the eyes.

The present invention has for an object to provide means whereby the vertical position of the lenses may be quickly and easily adjusted.

With the above and other objects in view, the invention may be said to comprise the spectacles as illustrated in the accompanying drawing hereafter described and particularly set forth in the appended claims, together with such variations and modifications thereof as will be apparent to one skilled in the art to which the invention appertains.

Reference should be had to the accompanying drawing forming a part of this specification in which:

Figure 1 is a front elevation of spectacles embodying the invention.

Fig. 2 is a transverse vertical section taken on the line indicated at 2—2 in Fig. 1.

Fig. 3 is a top plan view of the spectacles.

Fig. 4 is a rear elevation with the connecting portion between the lenses broken away and shown in section.

Fig. 5 is a fragmentary rear elevation showing a modified construction embodying the invention.

Fig. 6 is a fragmentary top plan view of the spectacles shown in Fig. 5.

In the accompanying drawing, the invention is illustrated as applied to spectacles of the type known as shooting spectacles in which the lenses 1 are of relatively large size and of convex form, being usually made of colored glass to reduce the glare of the sun. The lenses 1 are secured in suitable rims 2, the inner ends of which are rigidly connected by means of a vertically elongated connecting member 3 which is integrally united with the rims of the two lenses.

The usual bows 4 may be attached to the outer ends of the lens rims for holding the spectacles in place and the connecting member 3 serves to support face engaging elements which serve to position the spectacles on the face of the wearer. The connecting member 3 is provided with a longitudinal bore in which is slidably mounted a threaded rod 5 and between the upper and lower ends of a connecting member, there is an aperture 6 in which is mounted a nut 7 in which the rod 5 is threaded, the nut 7 being rotatable to adjust the rod 5 vertically in the connecting member. The lower end of the rod 5 projects below the lower end of the connecting member 3 and is provided with an outward bow 8 terminating in an inwardly projecting end portion 9 to which a nose piece 10 is connected by a transverse pivot 11. The upper end of the rod 5 projects above the top of the connecting member 3 and is provided with an outward bow 12 terminating in an inwardly projecting end portion 13, to which is rigidly attached a transversely elongated forehead rest 14. The upper and lower ends of the rod 5 are bendable to adjust the nose piece 10 and forehead rest 14 inwardly and outwardly with respect to the connecting member 3, both the nose piece and the forehead rest being inwardly offset with respect to the connecting member and with respect to the lens rims so that the spectacle frame is supported in a position spaced outwardly from the face of the wearer, the upper edge portions of the lenses being spaced outwardly from the eye-brows so that perspiration on the forehead will not flow onto or be wiped off on the lenses.

The nose piece and the forehead rest serve to support the entire spectacle frame out away from the face of the wearer so that there will be a free circulation of air between the face and the lenses which will prevent fogging of the lenses by condensation of water vapor arising from perspiration on the face.

In addition, the forehead rest combined with the nose-piece provides a very solid and comfortable support for the spectacles on the face of the wearer, the wide forehead rest taking a considerable part of the pressure which is ordinarily imposed upon the nose piece.

By adjusting the rod 5 upwardly, the position of the lenses with respect to the eyes will be moved downwardly and by adjusting the rod 5 downwardly, the position of the lenses is raised.

When the spectacles are worn for shooting, it is desirable that the position of the lenses be high with respect to the eyes so that the upper edges of the rims are entirely out of the range of vision, while for motoring or golfing, a lower position of the lenses is much more desirable. By turning the nut 7, the nose piece and forehead rest may be adjusted bodily to obtain the desired adjustment of the lenses with respect to the eyes.

By bending the bowed end portions of the rod 5, either the nose piece or the forehead rest may be adjusted inwardly or outwardly with respect to the spectacle frame to vary the spacing of the spectacle frame from the face of the wearer.

Figs. 5 and 6 of the drawing illustrate the invention in a slightly modified form. In this modification, a threaded rod 15 is mounted for vertical adjustment in the connecting member 3 and this rod carries a nose piece 16 at its lower end below the connecting member 3, a nut 17 similar to the nut 7 being provided for adjusting the rod 15 and nose piece carried thereby. A transversely elongated forehead rest 18 is mounted on the spectacle frame above the connecting member 3 and this forehead rest is provided with end portions 19 bent at right angles to the body thereof and integrally united with the rims 2 of the lenses, the bent end portions 19 serving to offset the forehead rest 18 inwardly with respect to the spectacle frame. In this modification, as well as in the modification first described, the forehead rest 18 provides a solid support for the upper portion of the spectacle frame and serves to relieve the nose of a considerable portion of the pressure which would otherwise be imposed on the nose piece. The vertical adjustment of the nose piece 16 serves to adjust the position of the lenses up or down with respect to the eyes, as in the modification first described.

It will be apparent that the present invention provides spectacles which are comfortably and solidly supported, which are readily adjustable as occasion may require and which are neat and attractive in appearance.

What I claim is:

1. Spectacles comprising a pair of lenses, a connecting member joining the lenses, a nose piece below said connecting member, a member mounted for vertical adjustment in said connecting member and a transversely elongated forehead rest carried by said vertically adjustable member above said connecting member and offset inwardly with respect to the lenses to hold the upper edges of the lenses spaced outwardly from the face of the wearer.

2. Spectacles comprising a pair of lenses, a connecting member joining the lenses, a member mounted for vertical adjustment in said connecting member, a nose piece carried by said member at its lower end, and a transversely elongated forehead rest carried by said vertically adjustable member at its upper end and offset inwardly with respect to the lenses to hold the upper edges of the lenses spaced outwardly from the face of the wearer.

3. Spectacles comprising a pair of lenses, a connecting member joining the lenses, a rod slidably mounted in the connecting member and projecting above and below the same, means for adjusting said rod vertically in the connecting member, a transversely elongated forehead rest attached to the upper end of said rod, and a nose piece attached to the lower end of said rod.

4. Spectacles comprising a pair of lenses, a connecting member joining the lenses, a rod slidably mounted in the connecting member and having inwardly projecting end portions above and below said connecting member, a forehead rest attached to the upper inwardly projecting end of the rod, and a nose piece attached to the inwardly projecting lower end thereof.

5. Spectacles comprising a pair of lenses, a connecting member joining the lenses, a rod slidably mounted in the connecting member and having inwardly projecting end portions above and below said connecting member, a forehead rest attached to the upper inwardly projecting end of the rod, and a nose piece attached to the inwardly projecting lower end thereof, the end portions of said rod being bendable to adjust the forehead rest and nose piece inwardly or outwardly with respect to the lenses.

In testimony whereof I affix my signature.

LOUISE C. KING.